United States Patent
Vaughn

(10) Patent No.: US 11,104,331 B2
(45) Date of Patent: Aug. 31, 2021

(54) AUTONOMOUS TECHNIQUES FOR VEHICLES WITH BALANCE INPUT

(71) Applicant: INTEL CORPORATION, Santa Clara, CA (US)

(72) Inventor: Robert L. Vaughn, Portland, OR (US)

(73) Assignee: Intel Corporation, Santa Clara, CA (US)

(*) Notice: Subject to any disclaimer, the term of this patent is extended or adjusted under 35 U.S.C. 154(b) by 418 days.

(21) Appl. No.: 15/857,424

(22) Filed: Dec. 28, 2017

(65) Prior Publication Data

US 2019/0047554 A1 Feb. 14, 2019

(51) Int. Cl.
| | |
|---|---|
| G05D 1/08 | (2006.01) |
| B60W 30/09 | (2012.01) |
| G01C 21/36 | (2006.01) |
| G08G 1/16 | (2006.01) |
| G05D 1/02 | (2020.01) |
| G05D 1/00 | (2006.01) |
| B60W 10/30 | (2006.01) |
| B60W 10/20 | (2006.01) |
| B60W 10/08 | (2006.01) |

(52) U.S. Cl.
CPC ............ *B60W 30/09* (2013.01); *B60W 10/08* (2013.01); *B60W 10/20* (2013.01); *B60W 10/30* (2013.01); *G01C 21/3652* (2013.01); *G05D 1/0088* (2013.01); *G05D 1/021* (2013.01); *G05D 1/0246* (2013.01); *G08G 1/16* (2013.01); *G08G 1/165* (2013.01); *G08G 1/166* (2013.01); *B60W 2420/42* (2013.01); *B60W 2554/00* (2020.02)

(58) Field of Classification Search
CPC ...... B60W 30/09; B60W 10/08; B60W 10/20; B60W 10/30; B60W 2554/00; B60W 2420/42; B60W 50/16; B60W 30/095; B60W 2300/36; G08G 1/165; G08G 1/166; G08G 1/16; G05D 1/021; G05D 1/0088; G05D 1/0246; G01C 21/3652

See application file for complete search history.

(56) References Cited

U.S. PATENT DOCUMENTS

| | | | |
|---|---|---|---|
| 9,944,282 B1* | 4/2018 | Fields | B60W 40/08 |
| 10,026,309 B1* | 7/2018 | Nepomuceno | G08G 1/01 |
| 10,156,848 B1* | 12/2018 | Konrardy | G01C 21/3461 |
| 10,185,998 B1* | 1/2019 | Konrardy | G06Q 40/08 |
| 10,319,039 B1* | 6/2019 | Konrardy | G06Q 40/08 |
| 2016/0001781 A1* | 1/2016 | Fung | G16H 50/20 |
| | | | 701/36 |
| 2016/0358453 A1* | 12/2016 | Wassef | G08B 6/00 |
| 2017/0120804 A1* | 5/2017 | Kentley | B60W 30/08 |
| 2017/0355377 A1* | 12/2017 | Vijaya Kumar | B60W 50/0098 |
| 2018/0075538 A1* | 3/2018 | Konrardy | G06Q 40/08 |
| 2018/0257561 A1* | 9/2018 | Kapuria | H04N 5/372 |

OTHER PUBLICATIONS

Self Balancing BMW motorcycle (Year: 2016).*
Gyroscopic Balancing of a bicycle (Year: 2014).*

* cited by examiner

*Primary Examiner* — Masud Ahmed
(74) *Attorney, Agent, or Firm* — Schiff Hardin LLP

(57) ABSTRACT

In an example, a system is described. The system may include a vehicle requiring a balance input to maintain an upright position and a plurality of sensors to determine threats within an environment. Additionally, the system may include a controller to generate a plan in response to the threats and a proprioceptive system to provide feedback to a rider of the vehicle according to the plan.

23 Claims, 9 Drawing Sheets

400

600

AUTONOMOUS TECHNIQUES FOR VEHICLES WITH BALANCE INPUT

TECHNICAL FIELD

This disclosure relates generally to autonomous techniques for vehicles with less than four wheels, or those vehicles that rely on a system or human intervention to maintain an upright position.

BACKGROUND

Motorized bikes and other vehicle form factors with less than four wheels are widely used around the globe. These vehicle form factors often rely on a user to keep the vehicle upright. As a result of heavy reliance on a rider for balance and control, these vehicles are typically excluded from techniques applied to general autonomous vehicles. For example, these general autonomous vehicles operate without considering a need for system or rider based balance.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
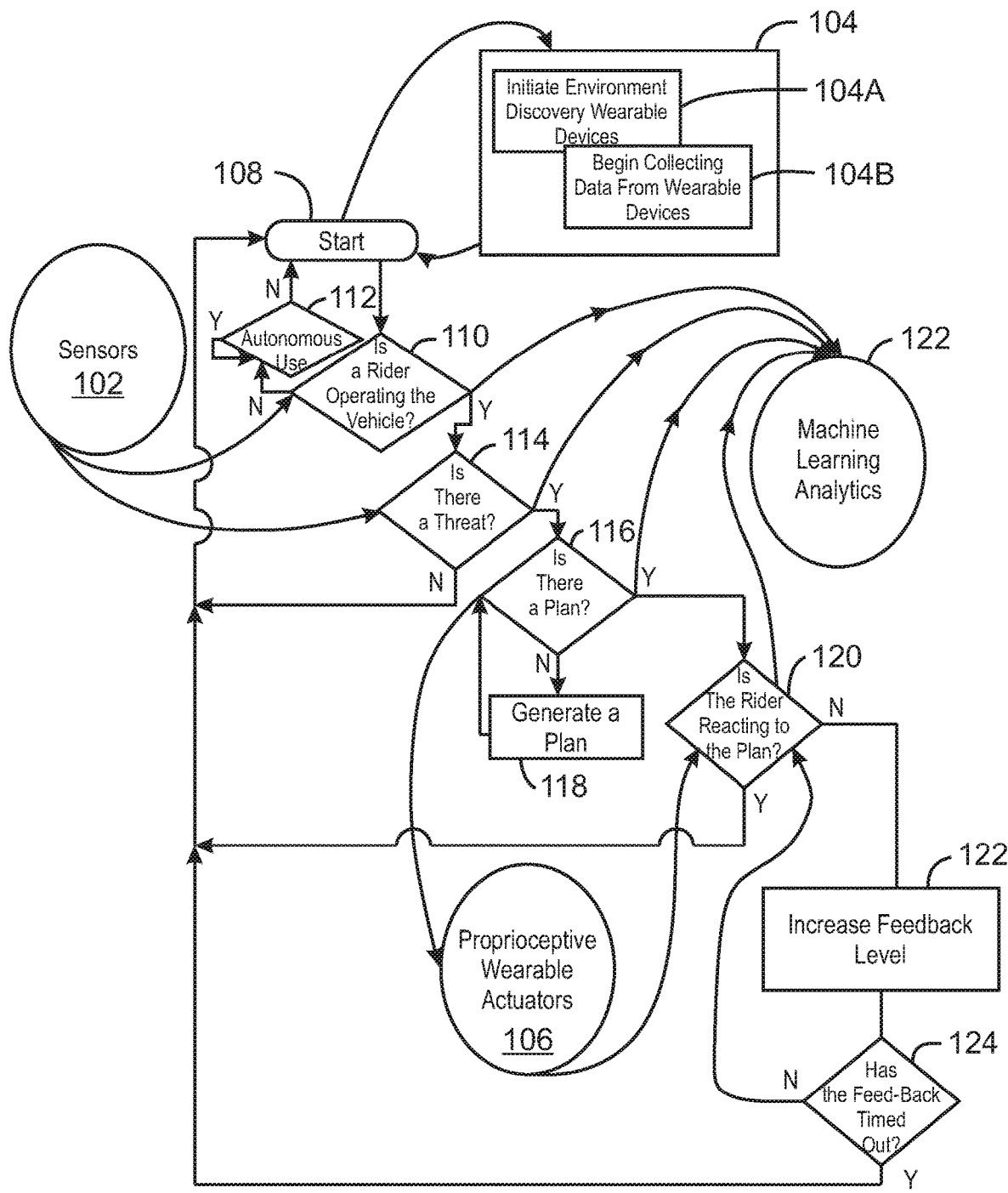
FIG. 1 is a process flow diagram of a method that enables a proprioceptive system.

As discussed above, vehicle form factors with less than four wheels are typically excluded from techniques applied to general autonomous vehicles largely due in part to a heavy reliance on the rider for balance of the vehicle. For example, executing a turn maneuver on a motorcycle or bicycle requires not only a turn of the handlebars by the rider, but the rider must maintain proper balance on the motorcycle or bicycle during the turn maneuver to prevent the motorcycle or bicycle from falling during the turn. Thus, autonomous vehicles have been often perceived as either four wheeled (cars), many wheeled (trucks), or as a completely different form factor such as drones. However, bicycles, motorcycles, tricycles, and other small form factor vehicles can operate as both semi-autonomous and fully autonomous vehicles.

Embodiments described herein enable semiautonomous and autonomous techniques for vehicles that require a balance input. For example, according to some embodiments, a semiautonomous navigation system enables proprioceptive feedback to a user operating a small form factor vehicle. The present techniques may leverage external or artificial stimuli of the rider, passenger, etc. to provide for predictive proprioceptive influencing control cues of rider. A proprioceptive wearable solution is provided that yields an advantage over acoustic and visual methods in that proprioceptive solutions provide for significantly less distraction to the rider/user.

The proprioceptive system enables a rider to briefly interact with other devices that the rider may be carrying. During the brief period where the rider may not have "eyes on the road," the proprioceptive system may provide alerts and any other information necessary to enable the rider to maintain control of the vehicle in a safe manner. Further, the proprioceptive system enables obstacle detection for a rider to better understand a threat through refined and scaled reactive methods. The alerts given by the proprioceptive system are distinguished from conventional methods with basic alarm on/off functionality.

During autonomous use, the present techniques leverage analytic systems to enable for vehicles with a balance input to be parked and subsequently moved to other nearby locations for parking optimization. Further, the present techniques leverage autonomous driving systems (i.e. from autonomous cars) to allow a power-augmented bicycle, motorcycle, moped, scooter, etc. to drive without steering assistance from the operator (i.e. rider, passenger, etc.). Additionally, gyroscopic and mechanical balancing mechanisms may be leveraged to balance or keep the vehicle upright when stopped or at a slow enough speed that natural gyroscopic effects of rotating wheels are not present.

Some embodiments relate to a route prediction system such as a route prediction system on a computer, a phone, a car, etc. In some embodiments, the route prediction system identifies to the rider a driving route that the rider has previously taken. Cues for the driving route may be presented to the rider via the wearable proprioceptive system. The predicted route can be suggested in response to a recognition by the system that there is a high probability that the rider is to repeat a previously traveled route.

The present techniques are to be distinguished from fully robotic systems or remote controlled vehicles. These fully robotic and remote controlled systems are not designed to carry human passengers, and thus can disregard the concept of balance that cannot be ignored in form factors such as bicycles and motorcycles designed to carry humans. Moreover, the present techniques can accommodate riders of varying sizes and shapes. Additionally, the present techniques can be implemented by retrofitting current vehicles.

FIG. 1 is a process flow diagram of a method 100 that enables a proprioceptive system. The method 100 takes as input data from a plurality of sensors 102, wearable devices 104, and proprioceptive wearable actuators 106. The plurality of sensors 106 may include pressure sensing handle grips, cameras to capture visual observations of the rider, infrared sensors to realize gaze analysis derived from a visual observation of the rider, accelerometers, gyroscopes, temperature sensors, and other sensors. Additionally, sensors of the vehicle may include a Global Positioning System (GPS) sensor, compass, and other sensors to determine orientation of the bicycle, orientation upon a road or path, and sensors to identify hazards (such as vehicles, pedestrians, etc.).

The method 100 begins at the start 108. A plurality of wearable devices 104 may be initialized through a discovery process at block 104A. Data from the wearable devices 104 may be collected at block 104B. The data collection process at 104B may be continuous or periodic. At decision block 110, it is determined if a rider is operating the vehicle. As used herein, the term vehicle may refer to a wheeled form factor that requires balancing by a rider when a rider is present. However, the vehicle may be able to move without the presence of a rider. In such a scenario, balance is maintained via a balancing system of the vehicle, which may include the plurality of sensors 102. The term vehicle may also refer to any vehicle with less than 4 wheels, such as a tricycle. In some cases, a vehicle requiring balance may have a narrow form factor with four wheels positioned sufficiently close (as in the two front wheel mounted next to each other and the two rear wheel mounted next to each other) together as to require balance in a similar manner as a bicycle. Unless otherwise noted, the use of the term vehicle refers to a form factor that uses some balance input during operation.

At decision block 110, if a rider is not operating the vehicle, process flow continues to block 112. At block 112, it is determined if the vehicle is involved in an autonomous use scenario. If the vehicle is involved in an autonomous use scenario, process flow remains in the autonomous use scenario until it is complete. Autonomous use scenarios will be discussed further below. Process flow then returns to the start block 108. If a rider is operating the vehicle, process flow continues to decision block 114. The determination if a rider is operating the vehicle at decision block 110 may be made by analyzing data from the plurality of sensor 102. For example, a pressure sensor located in a seat of the vehicle may detect the presence of a user via pressure being applied to the seat. The amount of pressure applied to the seat may indicate that a rider is sitting on the seat and is operating the vehicle or preparing to operate the vehicle. Similarly, sensors in the handlebar of the vehicle may detect that a rider is gripping the handles, which can indicate that the rider is operating the vehicle or preparing to operate the vehicle. In embodiments, data from a plurality of sensors may be combined to indicate a likelihood that a rider is operating the vehicle. If the likelihood is above a predetermined threshold, then the method 100 may determine that a user is operating the vehicle. For example, pressure sensor data may be combined with accelerometer data to derive a likelihood that acceleration detected by the accelerometer is caused by a rider as detected by a pressure sensor of the vehicle.

At decision block 114, it is determined if there is a present threat. A threat may be any obstacle, any type of vehicle, person, animal, and the like, that may interfere with the operation of the vehicle. The interference may be a potential collision with the vehicle. The interference may also be an object that breaches a protective envelope surrounding the current vehicle. In embodiments, the protective envelope is a defined region that surrounds the rider in space. The protective envelope may be based on speed. For example, at speeds under ten miles per hour, the protective envelope may be a sphere with a radius of ten feet surrounding the vehicle. As speed increases, the size of the protective envelope may also increase. For example, at twenty miles per hour, the protective envelope may be a sphere with a radius of twenty-five feet surrounding the vehicle. Thus, in embodiments, the size of the protective envelope is directly proportional to the speed of the vehicle.

At decision block 114, if a threat is not present, process flow returns to the start block 108. If a threat is present, process flow continues to the decision block 116. At decision block 116, it is determined if there is a plan. As used herein, a plan is at least one action that a rider can execute to avoid or minimize the threat. For example, if a car breaches the protective envelope to the left of the rider/vehicle during operation (and thus may interfere with the rider through a potential collision), one action may be for the rider to move to the right. In such a scenario, the plan may be for rider to shift the current path of the vehicle to the right. While this present example includes one action within the plan, the plan may include any number of actions.

Proprioceptive wearable actuators 106 are to provide feedback to the rider indicating the plan. The proprioceptive wearable actuators 106 enable the rider to determine his or her location in relation to the environment, even portions of the environment that are not visible to the rider. The proprioceptive wearable actuators 106 may provide haptic, tactile, or kinesthetic feedback to the rider. In embodiments, the proprioceptive wearable actuators 106 may comprise a system of vibrating, rolling, shaking, or percussion motors, either embedded within wearable devices or garments 104, or embedded within the vehicle handgrips, pedals, and seat. The proprioceptive wearable actuators 106 may be sent a control signal to activate movement via a motor such as vibration, rolling, shaking, percussion, and the like, according to the plan. The control signal may be sent via any wired or wireless interconnect. For example, the control signal may be sent via communication methods such as wireless (i.e. Bluetooth, WIFI, etc.) or even wired such as Ethernet.

For example, proprioceptive wearable actuators 106 may be in communication with devices embedded within wearables 104 such as a helmet, scarf or other protective neck wear, jacket, shirt, vest, gloves, sleeves, belt, pair of pants, pair of shorts, bracelet, anklet, shoes, socks, and the like. These proprioceptive wearable actuators 106 within these garments can apply haptic, tactile, of kinesthetic feedback to a user according to a plan that is tailored to avoid interference from any threat. The vehicle may also be fitted with proprioceptive actuators. Any portion of the vehicle that makes contact with a rider can be fitted with a plurality of proprioceptive actuators. For example, the handlebars, pedals, or seat of the vehicle can be fitted with proprioceptive actuators. Thus, the proprioceptive wearable actuators 106 may include proprioceptive actuators located on the vehicle.

At decision block 116, if a plan is not available, process flow continues to block 118. At block 118, a plan is generated in response to the perceived threat, and process flow returns to block 116. If a plan is available, process flow continues to decision block 120. At decision block 120, it is determined if the rider is reacting to the plan. In embodiments, personal responses of the rider can be learned over time, and the feedback can be adapted based on previous responses of the user. Consider again with the example immediately above. If the plan is for the user to move to the right, haptic feedback from the proprioceptive wearable actuators 106 may cause a right glove to vibrate. If the rider is not wearing gloves, the right side of a jacket may vibrate. In embodiments, the right handle of the bike may vibrate. Here, the vibrations on the right side of the proprioceptive actuators indicate some movement could occur to the left near the rider. By moving to the right, the rider avoids enabling the car to breach the protective envelope to the left by causing an interference.

If the rider is reacting to the plan at decision block 120, process flow returns to the start block 108. If the rider is not reacting to the plan, process flow continues to block 122. At block 122, a feedback level may be increased in response to the rider not reacting to the plan. For example, the intensity of the haptic, tactile, or kinesthetic feedback may be increased. In embodiments, the vibrations may be increased for a certain period of time. Process flow then continues to decision block 124 to determine if a time period for feedback has been exceeded or timed out. For example, the period of time may be five seconds. The period of time may be determined by a rider prior to using the proprioceptive system. During the pre-determined time period, the system monitors a rider's reaction to the plan, and increases the intensity of the feedback if the user is not reacting to the plan. At block 124, if, after the feedback is increased, the rider does not react to the plan within the time period, the feedback may time out and process flow returns to the start 108. At decision block 124, if the feedback has not timed out process flow returns to block 120.

A machine learning (ML) analytics block 122 determines learns correlations between vehicle data and various real world events via a machine learning system. As an example of one of many possible opportunities to leverage machine learning algorithms, the present techniques may, during riding, observe the orientation of the rider's head. Typically, the user is looking forward. However, the system may observe that as a vehicle approaches then the user may react differently given different speeds of the vehicle and the bicycle. For example, a rider may react minimally when a car is approaching from the rear at a slow rate of speed. However, when a vehicle is approaching from the rear at a high rate of speed then it may startle the rider such that he or she then slows to a near stop.

Regarding the aforementioned example, there will be broad uniqueness to each rider's reactivity to passing vehicles. The system, being aware of this reactivity, may use this information to provide feedback to the rider that a vehicle is approaching at a high rate of speed prior to the point at which the rider would hear the approaching vehicle. If the system were to observe the nature of the path or track of the vehicle and determine that it was stable (like the approaching vehicle is not swerving from a drunk driver) then the system could, as an example, provide a haptic "pulse" to the rider's seat and handle bars. That haptic feedback would help the rider to maintain speed and lack surprise at the oncoming vehicle. If, on the other hand, the approaching vehicle was driving erratically then the system could provide for a different haptic feedback such that the rider could be warned. The correlations learned via machine learning are further described with respect to FIG. 2.

Figure 2:
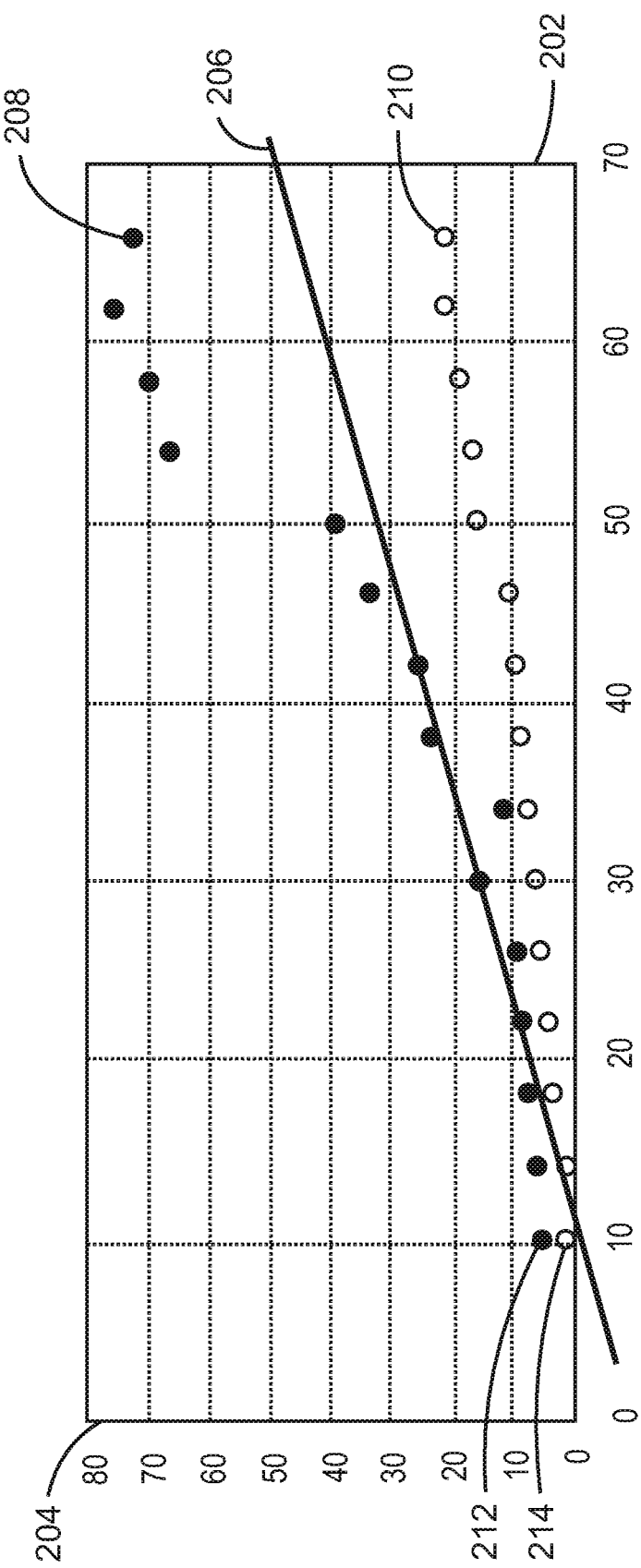
FIG. 2 is a graph of learned correlations.

FIG. 2 is a graph 200 of learned correlations. FIG. 2 illustrates a series of observations of a rider riding at 22 miles per hour (MPH) and how the rider reacts to vehicles passing at various speeds. Accordingly, the graph 200 includes an x-axis 202 that represents a series of observations, where observation is of a rider riding 22 mph, and a y-axis 204 that represents speed in miles per hour. In particular, the graph 200 illustrates both the speed of a vehicle approaching the rider from the rear and the corresponding reaction of a rider to reduce speed in response to the passing vehicle. The plurality of black dots, such as dot 208, represent the vehicle (for example, a car). The plurality of white dots, such as dot 210, represent a change in speed of the rider on a vehicle requiring a balance input. The line 206 represents a delineation across the cluster of data points.

The scatter diagram in FIG. 2 illustrates how the bike directional reactivity to a bike speed decrease as an approaching vehicle speed varies. For example, along the x-axis near 10 mph, the black dot 212 represents a vehicle approaching the rider (a rider riding 22 mph) from behind at 8 MPH and the white dot 214 dot represents a quantity in miles per hour that the rider decreases his/her speed. The observation might suggest that the rider changed his/her riding speed only very minimally with a car passing as a slow speed. In another example, at points 208 and 210, the rider is being passed by a vehicle at 72 mph (point 208). This causes the rider to decrease speed by over 20 mph. For a rider initially traveling at 22 mph, a 20 mph decrease in speed means effectively the rider has come to a stop. The correlation implies that this rider is not very comfortable with cars passing him/her when both the rider and passing vehicle are going at a fast rate of speed. With a bicycle, 22 MPH might be considered a high rate of speed. Accordingly, the system is able to learn how this particular rider will react. By being aware of correlations between vehicle data and real world events, the present techniques can closely tailor the feedback given to the rider to the rider's generally known and observed responses. Put another way, the present techniques can offer an indication of the response of a rider that mimic how a rider would typically respond via the learned correlations.

The present techniques leverage known autonomous vehicle methods such as sensing and navigating a vehicle without human input. As described above, the semi-autonomous bicycle provides movement and balance with a rider. When the semiautonomous vehicle system involves carrying a rider then the system can provide for "attention-less" operation or "assisted" operation. By attention-less, the intent is that the semiautonomous vehicle system can carry a rider without the rider having to pay attention. For example, the rider may be watching a TV program or reading a web page while in motion with a device such as a head worn glasses or goggle projection capable system. In a more practical sense, the rider could benefit from some assistance while performing an activity such as configuring an address in a GPS application, changing a radio station (i.e. Pandora), or adjusting safety gear.

Accordingly, semiautonomous use cases can enable a rider to temporarily not pay attention during operation of the vehicle. Rider assistance may be useful when eyes are away from the road such as looking at a smartphone to set GPS, change a music track, initiate a call, or when turning one's head to check for traffic. The present techniques will also be able to provide proprioceptive input to the rider to increase safety. In embodiments, the present techniques can be used for accident avoidance by increasing rider safety when a threat to the system occurs by using proprioceptive controls to influence direction of the rider.

Moreover, in embodiments, the present techniques can leverage analytic systems to aid in rider fitness synchronization/feedback (like riding with a group and instructor) and in determining rider fatigue. Such a system might use the haptic feedback system to establish a pace by which the rider would rotate his/her legs. Additionally, such a system might use the haptic feedback system to have all riders begin to brake when the lead bicyclist begins to brake. Here, the system could leverage self-forming spatially aware platooning capabilities to trigger such events but benefiting from the haptic feedback system. A rider's leg rotation (i.e. peddling) speed as well as lag or slowness in response to haptic pace setting may be observed. This information could be relayed to the lead rider or instructor which may indicate rider fatigue. That relayed information could be displayed via a smartphone display, for example, on the instructor's bicycle. In this manner, the present techniques can be a tool is rider fitness implementations.

The vehicle according to the present techniques may have similar components for each of a semiautonomous and fully autonomous use case. First, a motorized system is to provide for forward and reverse motion. The vehicle may also have a braking capability that can be actuated through mechanical, electrical, pneumatic, hydraulic or other means. Further, the vehicle will include a steering capability that can be actuated through mechanical, electrical, pneumatic, hydraulic or other means. A balance capability of the vehicle may also be actuated through mechanical, electrical, pneumatic, hydraulic or other means involving gyroscopic stabilization or mechanical stabilization. The aforementioned components are able to be controlled from an onboard compute system. In some cases, the system may benefit from manual yet "attention-less" input from the rider such as pedaling or even steering.

Figure 3:
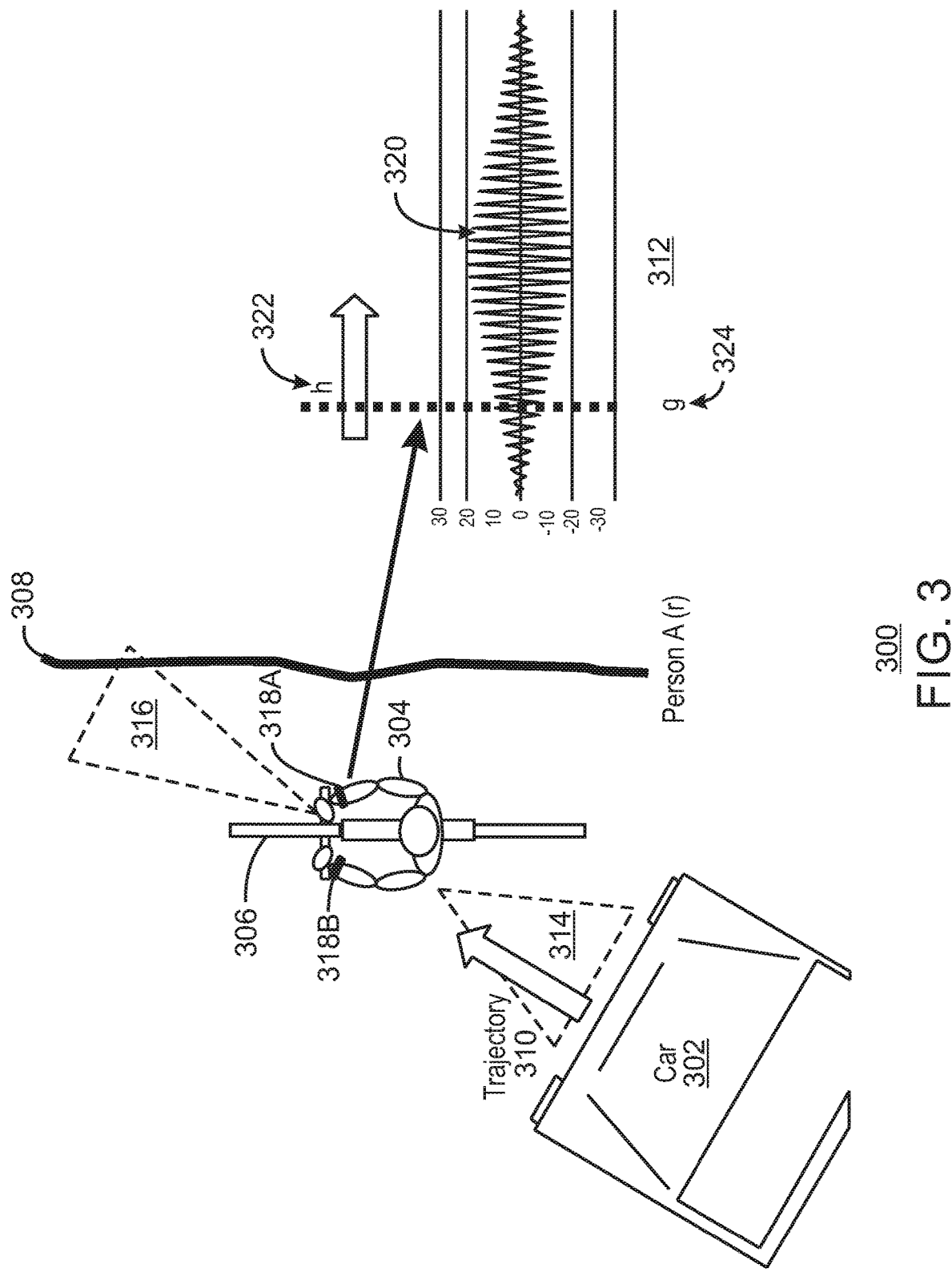
FIG. 3 is a top view of an environment and a graph.

FIG. 3 is a top view of an environment 300 and a graph 312. The environment 300 includes a car 302, a rider 304 on a bike 306, and a curb 308. As illustrated, the car 302 has a trajectory indicated by arrow 310. The car 302 is approaching the rider 304 from the rear right. The graph 312 illustrates an overall frequency range of the haptic feedback vibration (as an example) motor via a vibration profile 320. The dotted line (g) 324 illustrates the currently selected vibration amplitude. The arrow (h) 322 illustrates the intended direction of frequency adjustment to a higher amplitude to represent an increase in intensity of the signal to the rider.

FIG. 3 includes a proprioception system warning rider 304 of a possible impact with a car 302 and identification of the curb 308. The environment 300 is illustrated from above the rider/bicyclist. Sensors located within the proprioceptive system as worn by the rider 304 or on the bike 306 may be used to sense both of the car 302 and the curb 308. In particular, a plurality of sensors may scan the environment 300 and derive an area 314 within the dashed triangle, and an area 316 within the dashed triangle. The area 314 and the area 316 may represent areas of possible threats to the rider 304 and bike 306. Thus, the plurality of sensors monitor the threat from car 302 and curb 308.

A proprioceptive system may include proprioceptive wristbands 318A and 318B. In embodiments, the system recognizes the threat and determines an avoidance method or plan. For example, this plan may include steering to the right. The proprioceptive wristband 318A may indicate a direction the rider 304 should steer bike 306 by vibrating the right wristband 318A. The vibration provides an immediate indication of the proper action the rider 304 should take. The vibrating alert yields a quicker reaction when compared to an audible alert, as the rider 304 does not need to observe and then determine the proper evasive action.

Figure 4:
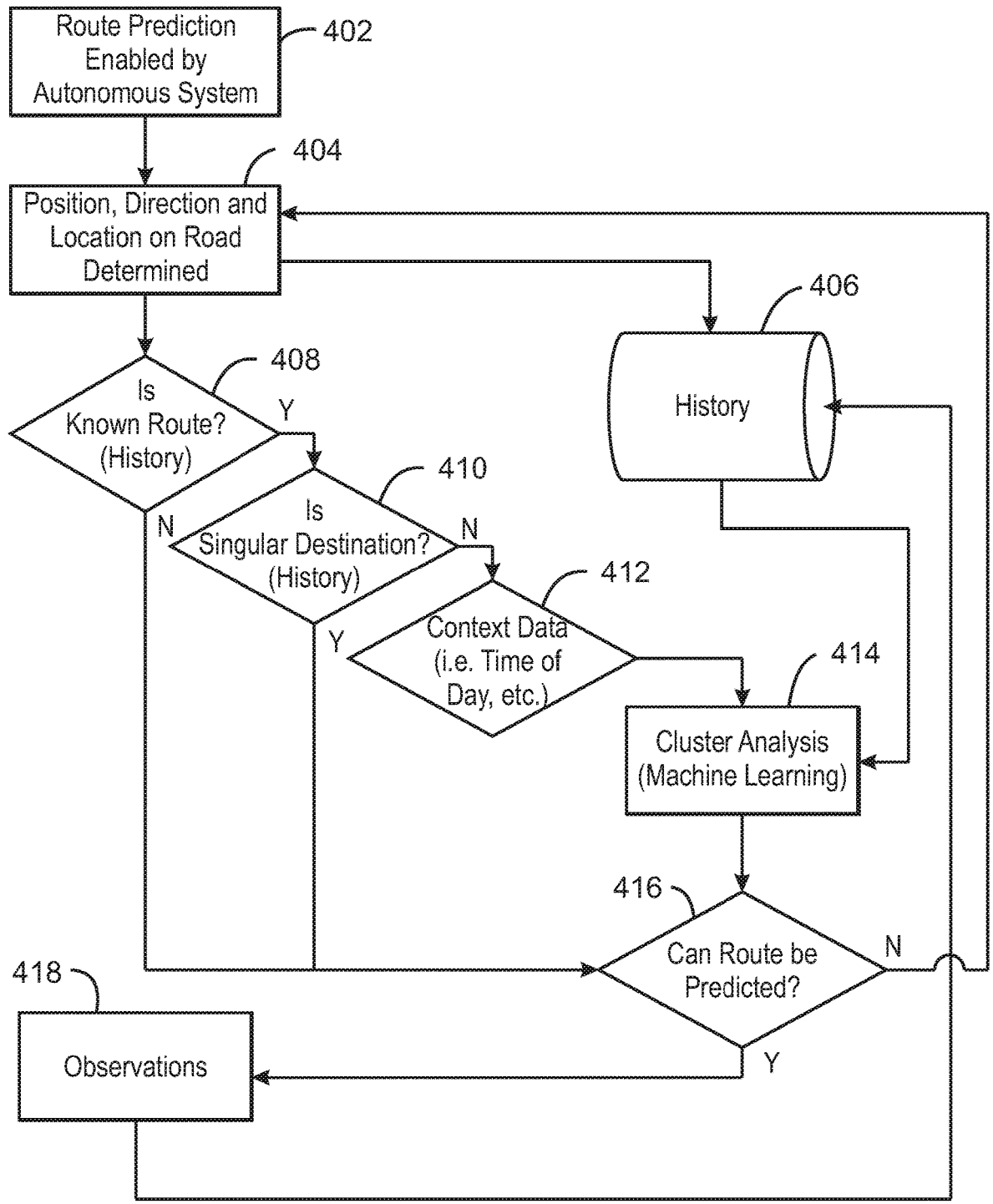
FIG. 4 is a process flow diagram of method for route prediction.

FIG. 4 is a process flow diagram of method 400 for route prediction. Route prediction enables a vehicle to leverage predictive and machine learning capabilities to determine what path the rider is intending to take with the vehicle. At block 402, route prediction is enabled by the autonomous system. At block 404, a position, direction, and location on the road is determined. This position is stored in a history repository 406. This position is also sent to decision block 408.

At decision block 408, it is determined if the position, direction, and location on the road is determined to be a component of a known route. If the position, direction, and location on the road is a component of a known route, process flow continues to decision block 410. If the position, direction, and location on the road is not a component of a known route, process flow continues to decision block 416.

At block 410, it is determined if the destination is singular-based on the history. If the destination in singular based on the history, process flow continues to block 416. A singular destination is a route that is identified as having a single destination rather than multiple destinations. This data aides in the routing determination. For example, if a rider typically commutes on a bicycle and always and only rides home after work then this allows for reinforcement of the prediction of the route. In other cases, where there may be multiple stops along a route that are not easily predicted then that also factors into the route prediction system. If the destination is not singular based on the history, process flow continues to block 412.

At block 412, a context of the data is obtained. In embodiments, the context includes the time of day, speed, weather, and other related driving conditions. In some embodiments, calendar integration can be used for route prediction to learn about the particular routes of a rider over time. At block 414, cluster analysis is performed. Cluster analysis, as one example of machine learning, is used to identify common occurrences of an action. An action could be an inference of the rider's route, rider reaction to passing vehicle, route prediction based on start of day, etc.

At block 416, it is determined if the route can be predicted. Based on the system's machine learning capabilities the system will assign a probability for the expected route. As the rider continues down a predicted route then that route is enforced. In embodiments, the probability that the predicted route is correct is increased if a rider proceeds along the predicted route. Once the probability is above a predetermined threshold, the route may be identified as able to be predicted.

In some cases, a cluster analysis may identify that at a certain intersection the rider may turn right or left. And, the direction turned may be reinforced through cluster analysis of previous occurrences that may provide a correlation, for example, as to when the rider left the office. If the route can be predicted, process flow continues to block 418. If the route cannot be predicted, process flow returns to block 404, where additional positional, direction, and location information is obtained.

At block 418, observations are made. Those observations include data such as direction, time of day, speed, etc. For example, if the rider varies significantly from the predicted route then the system may have to abandon the predicted route. Process flow then returns to block 404.

Figure 5:
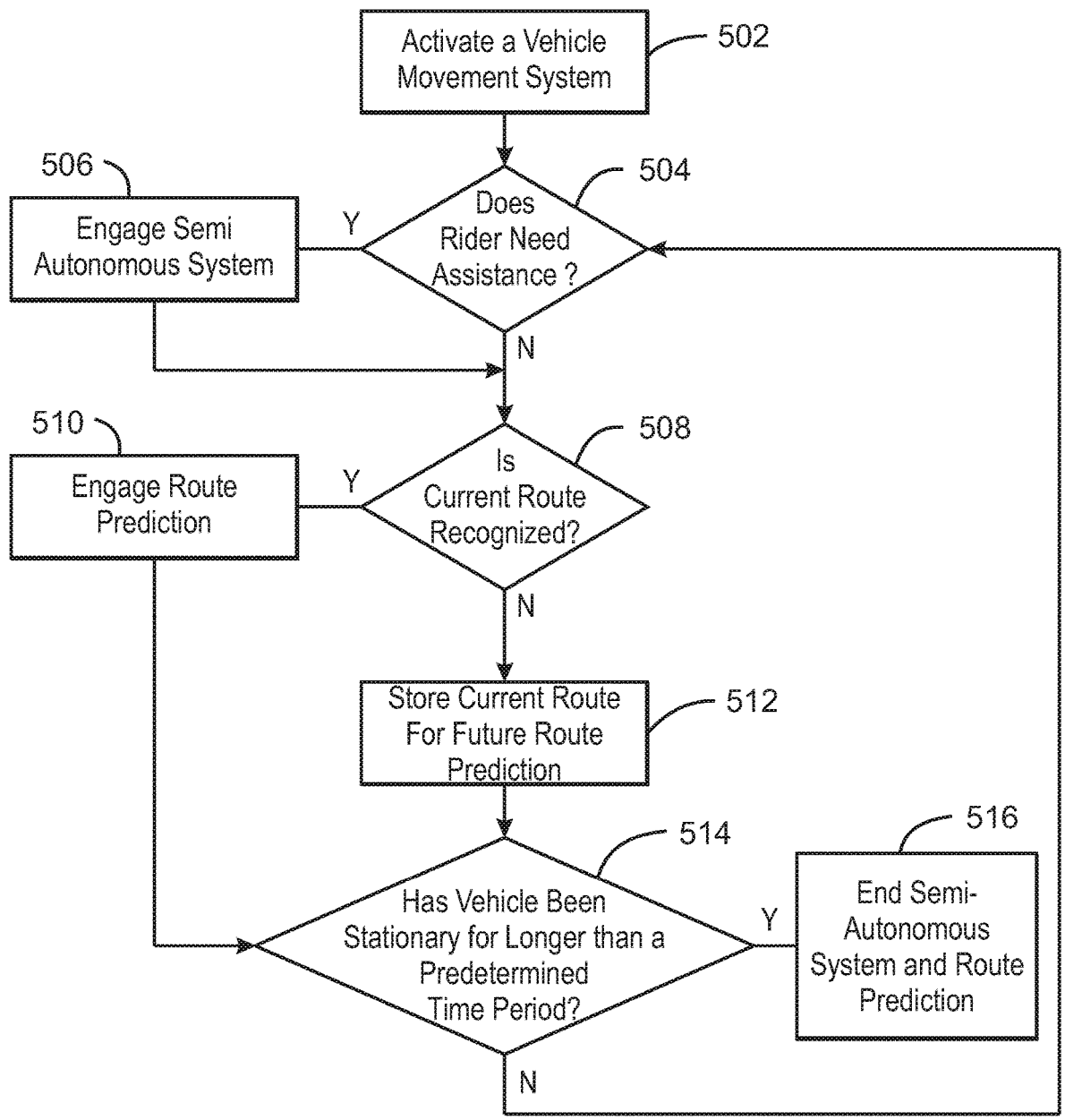
FIG. 5 is a process flow diagram of a method to enable a proprioceptive system with route recognition.

FIG. 5 is a process flow diagram of a method 500 to enable a proprioceptive system with route recognition. At block 502, a vehicle movement system is activated. In embodiments, the vehicle movement system can be activated by a rider providing human power via pedals of the vehicle. The vehicle movement system may also be activated by a motorized component of the vehicle that is used to enable motion of the vehicle.

At block 504, the system would be able to determine, in real-time, when the rider is in need of autonomous control assistance. In embodiments, the system may determine through the movement of a rider or a biometric indicator from the rider that assistance is needed. For example, sharp movements to maintain an upright position may indicate the rider is distracted, preoccupied, or cannot navigate the current environment alone.

At block 506, the semiautonomous system is engaged in response to the indication that a user has requested or required assistance. More specifically, a scenario may present where the rider touches her phone, like to search for a GPS location, and in that case the system would recognize that the rider is currently in motion and that more assertive feedback may be warranted. In more extreme cases, the user may be surfing on their phone or watching a video and have come to rely on the system being the "eyes" on the road for the rider. Still, in other cases, the system could recognize that a tire has gone flat, from contextual analysis of historical data points, and that the rider actually needs help. In such cases help may manifest in a manner where the system communicates via vehicle to infrastructure (V2I) systems to adjust the flow of traffic. The semiautonomous system implements autonomous control methods that may enable vehicle stabilization and control through proprioceptive input methods. In embodiments, the proprioceptive input methods include vibrating motors/mechanisms installed in the bicycle seat, handle grips, foot petals, helmet, wrist bands, ankle bands, belt (as in around the waist), jacket, etc. The analytic system may produce a series of inputs (vibrations) to provide an indication to the rider as to how to shift one's balance for stability, steering or braking whether active controls (i.e. steering motor input) or passive (i.e. rider shifting weight).

At block 508, it is determined if the current route is recognized. If the current route is recognized, process flow continues to block 510 where route prediction is engaged. The route prediction may be as described with respect to FIG. 4. If the current route is not recognized, process flow continues to block 512. At block 512, the current route is stored for future route prediction. In this manner, new routes are discovered and stored.

At decision block 514, it is determined if the vehicle has been stationary for longer than a predetermined period. If the vehicle has been stationary longer than a predetermined time period, process flow continues to block 516. At block 516, the execution of the semiautonomous system and route prediction ends. If the vehicle has not been stationary longer than a predetermined time period, process flow returns to block 504.

The techniques described above generally focus on semi-autonomous techniques with route prediction. However, the present techniques may also be implemented in a fully autonomous fashion. Autonomous use cases include scenarios where the vehicle operates without a rider. For example, the vehicle may be used as a delivery platform for delivering groceries, fast food, and the like without a rider. Another autonomous use case includes routing a vehicle to a destination for rental purposes without using a rider to deliver the vehicle to a destination. Finally, the vehicle may be used as a security patrol platform to patrol various areas such as neighborhoods, stores, parking lots, and the like.

Figure 6:
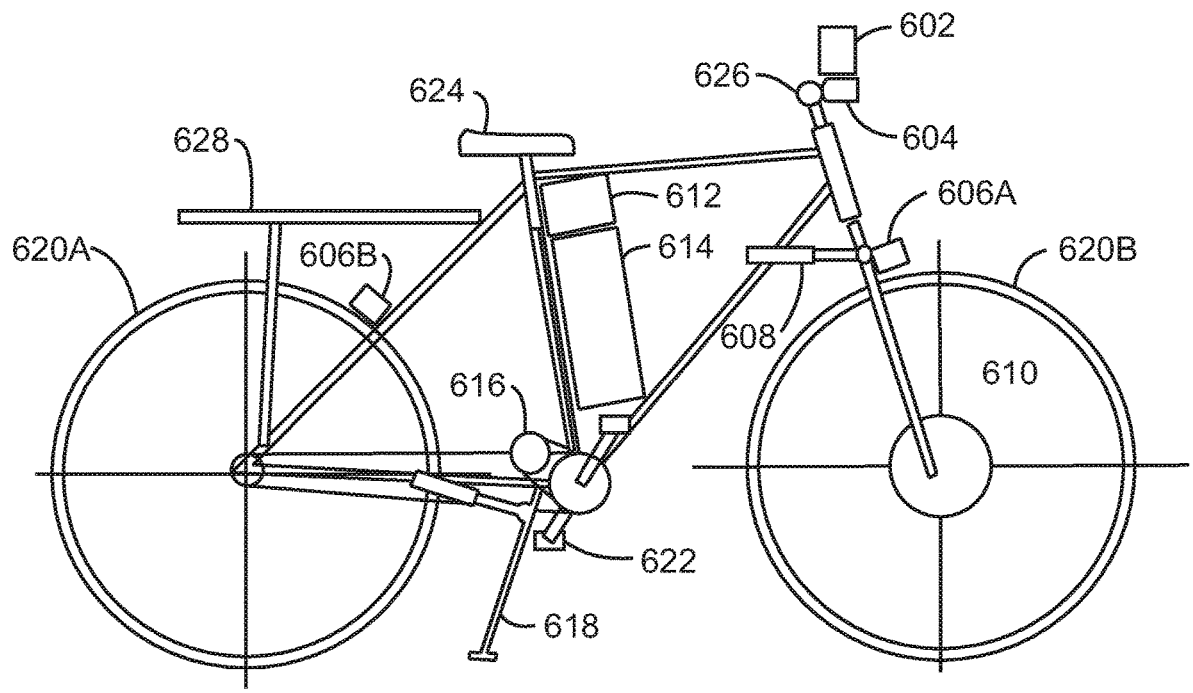
FIG. 6 is an exemplary bicycle system.

FIG. 6 is an exemplary bicycle system 600. The bicycle system 600 describes a possible configuration of components which may be included in an autonomous bicycle. In embodiments, the autonomous bicycle maybe used in a semi-autonomous fashion. While the bicycle system 600 represents a particular configuration, any autonomous bicycle configuration may be used. Accordingly, an autonomous bicycle system may have more or less components than illustrated in FIG. 6. The bicycle system 600 includes an imaging system 602. The imaging system may be a laser imaging system. In embodiments, the imaging system may also be an imaging system that does not require visible light imaging. The bicycle system 600 includes a visible light imaging system 604.

A brake system 606 may include braking systems 606A and 606B. The braking systems 606A and 606B may be electro-mechanical brake mechanism actuators. In embodiments, the braking capability may be actuated through mechanical, electrical, pneumatic, hydraulic or other means. An electro-mechanical steering actuator 608 may be used to implement a steering function. In embodiments, the steering function may be actuated through mechanical, electrical, pneumatic, hydraulic or other means.

The bicycle system 600 also includes an active gyroscopic stabilization system 610. The active gyroscopic stabilization system 610 provides a balance capability. In embodiments, the active gyroscopic stabilization system 610 keeps the bike in an upright position during autonomous driving. The active gyroscopic stabilization system 610 may be actuated through mechanical, electrical, pneumatic, hydraulic or other means involving gyroscopic stabilization or mechanical stabilization. Further, the bicycle system 600 includes a processing unit and communication system 612. The method 100 (FIG. 1), method 400 (FIG. 4), the method 500 (FIG. 5), and a method 700 (FIG. 7) below can be executed via the processing unit and communication system 612. The processing unit and communication system 612 may be an onboard computer system. Additionally, the processing unit and communication system 612 may include a memory to store routes and historical sensor data. In embodiments, the processing unit and communication system comprises an autonomous controller to enable autonomous movement by the bicycle system 600.

A battery system 614 may be used to provide motorized power to the bicycle system 600. In particular, the battery system 614 may provide power to a motorized drive unit 616. The motorized drive unit 616 is a motorized system to provide for forward and reverse motion. An electro-mechanical kick stand and actuator system 618 may be used for stability when the bike is stationary. In embodiments, the electro-mechanical kick stand and actuator system 618 may include various stand components along the bike 600 to return the bike to an upright position in the event the bike falls into a position where it cannot propel itself forward.

The bicycle system 600 may also include various components to enable use by a rider in a semi-autonomous fashion in the event the autonomous system becomes unusable or is undesirable. The wheels 620A and 620B of the bicycle system 600 may be powered by the electro-mechanical steering actuator 608 or a pedal system 622. The pedal system 622 may consist of two pedals that a rider can use to power the bicycle system 600. The rider may be seated on a seat 624, and can steer the bike with the handle bar 626. A package and other cargo may be stored on a platform 628.

As illustrated, FIG. 6 includes at least one wheel coupled with a frame. In embodiment, an autonomous scenario may include activating the motorized drive unit 616 to drive the at least one wheel forward or backward. The stabilization system 610 may be used to maintain an upright position of the at least one wheel coupled with the frame as the motorized drive unit propels the frame and the at least one wheel. In embodiments, the processing unit and communication system 612 may include a transmitter and receiver, and can receive instructions to traverse a route via control of the motorized drive unit and stabilization system.

Figure 7:
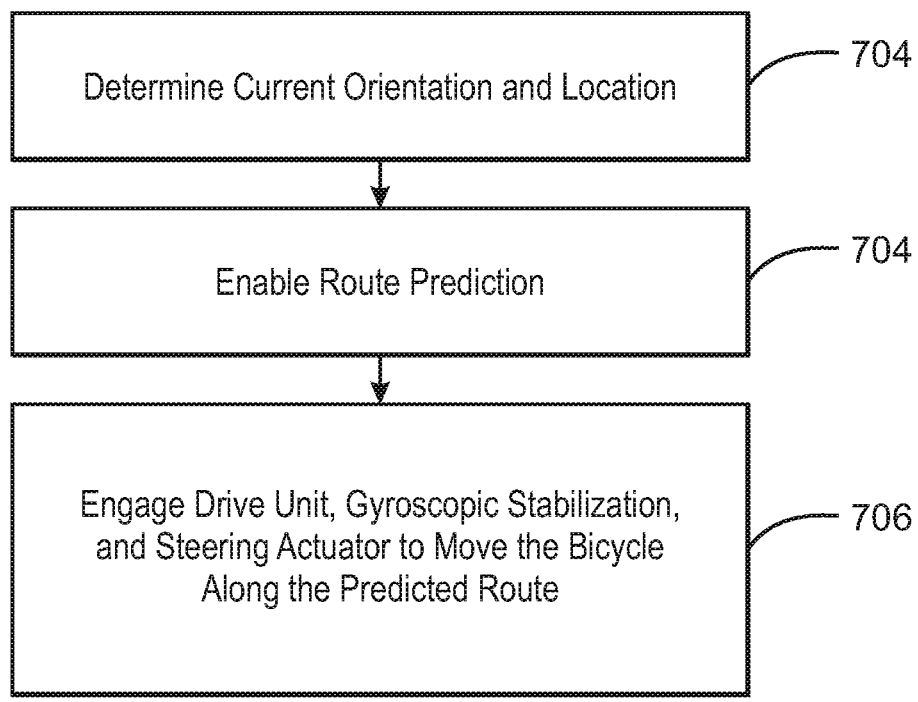
FIG. 7 is a process flow diagram of a method that enables an autonomous bicycle system.

FIG. 7 is a process flow diagram of a method 700 that enables an autonomous bicycle system. An autonomous bicycle system may include the system 600 without a rider for direction, balance, or propulsion. In some embodiments, a rider may be present but the autonomous bicycle maintains control of all bicycle processes, including balance and movement.

When the system involves movement/riding/motion without a rider or passenger then the system can provide for fully autonomous operation. The bicycle becomes a platform capable of running errands or distributing packages. A bicycle system, such as the bicycle system 600 (FIG. 6) is small and narrow, can fit into tight or congested areas, is a relatively safe platform for distributing goods (when compared to a four wheel vehicle), and the bulk of the platform (the bicycle) can serve the dual purpose of a bicycle as well as an autonomous delivery platform.

A fully autonomous bicycle platform will not require the proprioceptive input methods described with regard to semi-autonomous use. At block 702, a current orientation and location may be determined. In embodiments, the current orientation and location of the bicycle system may be determined via a plurality of sensors on the bicycle. A processing unit and communication system may be used to determine the orientation and location. The processing unit and communication system may be connected to WiFi in order to obtain traffic information, destination information, weather conditions, and the like.

In embodiments, sensors of the bicycle position may include accelerometers, GPS, compass, video and other sensors to determine orientation of the bicycle, orientation upon a road or path, hazards identification (such as vehicles, pedestrians, etc.) and other sensors. The present embodiment leverages known autonomous vehicle methods such as sensing and navigating a vehicle without human input.

At block 704, route prediction is enabled. The route prediction may be that of method 400 (FIG. 4). During route prediction, sensors and associated analytics maintain awareness of environment surrounding the bike system and a direction of the bike system. The route may be determined through known methods such as entering an address into a navigation application. At block 706, a drive unit, gyroscopic stabilization unit, and steering actuator may be engaged to move the bicycle toward a destination as defined by the route prediction. Autonomous control methods may control the bicycle stabilization and steering through the aforementioned electric motors, mechanical connections, etc. Motion can be facilitated through onboard (whether fully integrated or post-production fitted) motors or through manual input from humanoid robots (that lack autonomous vehicle control methods). A humanoid robot may or may not have the programming and sensors to facilitate full autonomous bicycle riding. In such cases the robotic rider could leverage the same methods provided to a human rider. In those case there may be general purposes capabilities added to robots to allow them to "wear" wristbands, vests, bracelets, etc. that have vibrating motors so that the robot could benefit from proprioceptive feedback. Having a humanoid robot connect to the bicycle system may introduces pairing and security concerns. Thus, providing for the ability of a humanoid robot to make use of human oriented technology offers more security over fully integrated, directly connected systems.

In some cases, parking with autonomous bicycles may present a challenge. Autonomous bicycles and other vehicle systems are small and can typically park on common areas such as walkways, and are movable by most anyone is in addressing parking. Parking for such autonomous systems may face challenges as bicycle parking areas fill up and over flow. An opportunity exists to allow for owners, operators, purveyors, etc. of those properties to dynamically reestablish parking boundaries and priorities. In embodiments, the autonomous bicycle system described above can be used for efficient parking.

For example, consider sending the autonomous bicycle to a grocery store to autonomous pick up groceries and return them to a user's location. The bicycle goes to the store and the bicycle parks itself. The bicycle communicates to the store that it has arrived. The store states that it may take thirty minutes to fulfill the order due to a large queue. The bicycle parking lot starts to over flow. A store employee moves one bicycle to a position thirty feet away on the sidewalk. The store employee moves another bike next to the current bike. The store employee then touches several other bicycles, and those other bicycles may move themselves alongside the other bikes. The store employee may make adjustments of the bikes that will ripples through the positions of the other bikes. The bicycle systems may implement machine learning systems to enable bicycles to not trip theft alarms and to allow the bicycles to "figure out" where to move to in order to maintain an efficient parking scheme. Accordingly, the resent techniques enable leveraging proprioceptive capabilities to facilitate semi-autonomous capabilities as well as integration of components such as stabilization and navigation systems for fully autonomous bicycles.

Figure 8:
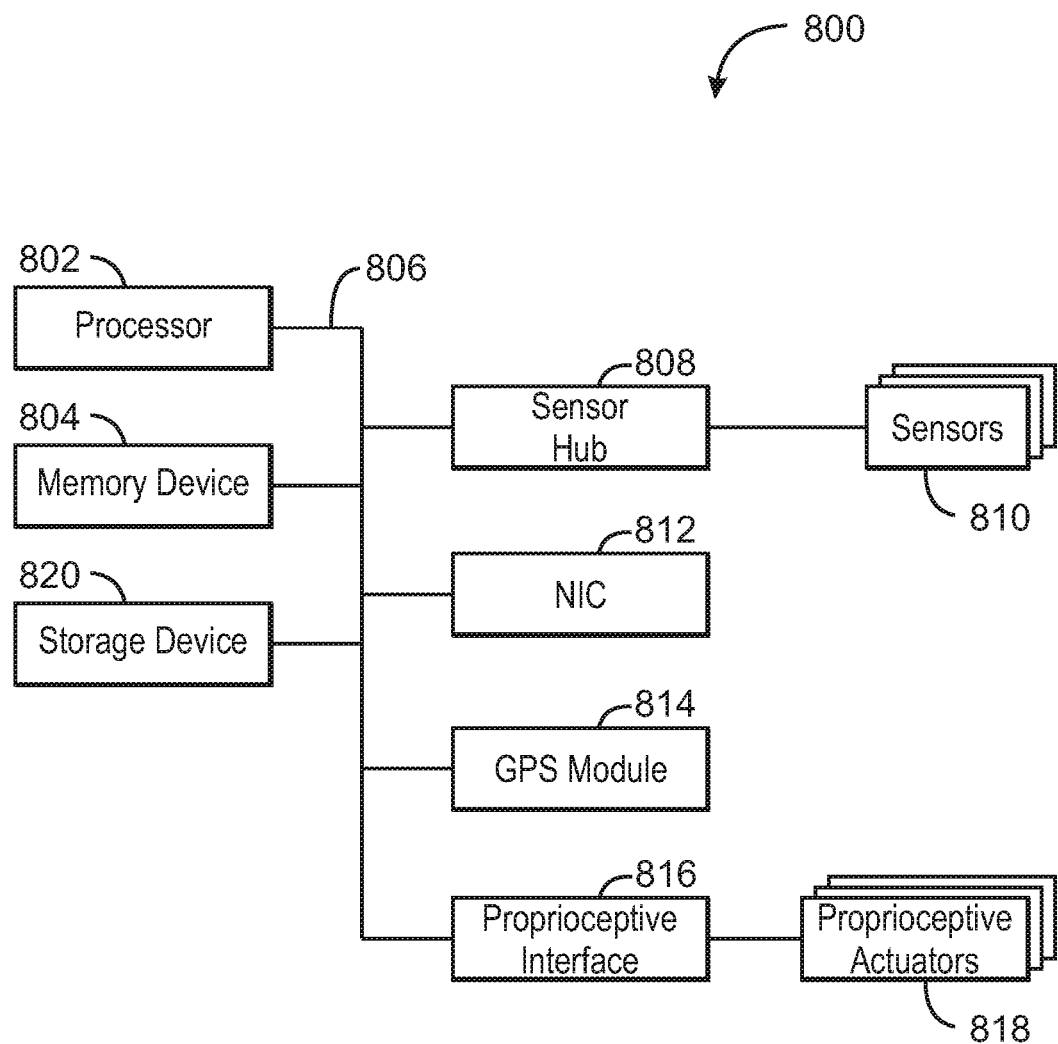
FIG. 8 is a block diagram of an example of a computing device that can implement enables semiautonomous and autonomous functionality.

FIG. 8 is a block diagram of an example of a computing device 800 that can implement enables semiautonomous and autonomous functionality. In some embodiments, computing device 800 is a processing unit and communication system. In some embodiments, computing device can be included in a vehicle (for example, in a motorcycle, bicycle, motorized bicycle, scooter, tricycle, unicycle, and the like). In some embodiments, any portion of the methods and/or systems illustrated in any one or more of FIGS. 1-7, and any of the embodiments described herein can be included in and/or be implemented by computing device 800. The computing device 800 may include, for example, a navigation device, a GPS device, a mobile phone, mobile device, handset, laptop computer, desktop computer, or tablet computer, among others. The computing device 800 may include a processor 802 that is adapted to execute stored instructions, as well as a memory device 804 (and/or storage device 804) that stores instructions that are executable by the processor 802. The processor 802 can be a single core processor, a multi-core processor, a computing cluster, or any number of other configurations. For example, processor 802 can be an Intel® processor such as an Intel® Celeron, Pentium, Core, Core i3, Core i5, or Core i7 processor. In some embodiments, processor 802 can be an Intel® x86 based processor. In some embodiments, processor 802 can be an ARM based processor. The memory device 804 can be a memory device and/or a storage device, and can include volatile storage, non-volatile storage, random access memory, read only memory, flash memory, or any other suitable memory or storage systems. The instructions that are executed by the processor 802 may also be used to implement autonomous and semi-autonomous functionality as described in this specification.

The processor 802 may also be linked through the system interconnect 806 (e.g., PCI®, PCI-Express®, NuBus, etc.) to a sensor hub 808 adapted to connect the computing device 800 to a plurality of sensors 810. The plurality of sensors 810 may include may include pressure sensing handle grips, visual observation of the rider position, gaze analysis derived from visual observation of the rider, include accelerometers, compass, video and other sensors to determine orientation of the bicycle, orientation upon a road or path, hazards identification (such as vehicles, pedestrians, etc.) and other sensors.

In addition, one or more network interface controllers (also referred to herein as a NIC) 812 may be adapted to connect the computing device 800 through the system interconnect 806 to one or more networks or devices (not depicted). The network (not depicted) may be a cellular network, a radio network, a wide area network (WAN), a local area network (LAN), or the Internet, among others. In some embodiments, one or more NIC 812 can include a wireless device to connect to a GPS network, and/or to one or more satellites (for example, one or more GPS satellites). Thus, the computing device 800 may include a GPS or other positioning system module 814.

The processor 802 may be connected through system interconnect 806 to a proprioceptive interface 816 adapted to connect the computing host device 800 to one or more proprioceptive actuators 818. The proprioceptive actuators 818 may include, for example, a wearable jackets, shirts, pants, belts, and the like. The proprioceptive actuators 818 may also include wearables such as bracelets, anklets, rings, shoes, shoe inserts, necklaces, sleeves, braces, and so forth. Moreover, proprioceptive actuators 818 may be located on the vehicle, such as seat, handlebar grip, and other actuators located on a portion of the bike where a rider would feel when the actuator is activated. The proprioceptive actuators 818 may be built-in components of the computing device 800, or may be devices that are externally connected to the computing device 800.

In some embodiments, the processor 802 may also be linked through the system interconnect 806 to a storage device 820 that can include a hard drive, a solid state drive (SSD), a magnetic drive, an optical drive, a USB flash drive, an array of drives, or any other type of storage, including combinations thereof. In some embodiments, the storage device 820 can include any suitable applications. In some embodiments, the storage device 820 can include a basic input/output system (BIOS).

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, additional modules, additional network interfaces, etc.) In some embodiments, databases and/or storage devices described herein can be coupled within computing device 800 (for example, as a storage device such as storage device 820, and/or can be connected to computing device 800, for example, using NIC 812). In some embodiments, sensors can be coupled to the computing device 800. In some embodiments, sensors such as, for example, one or more pressure sensors, vehicle sensors, cameras, audio sensors, steering wheel sensors, etc. can be included in computing device 800.

Figure 9:
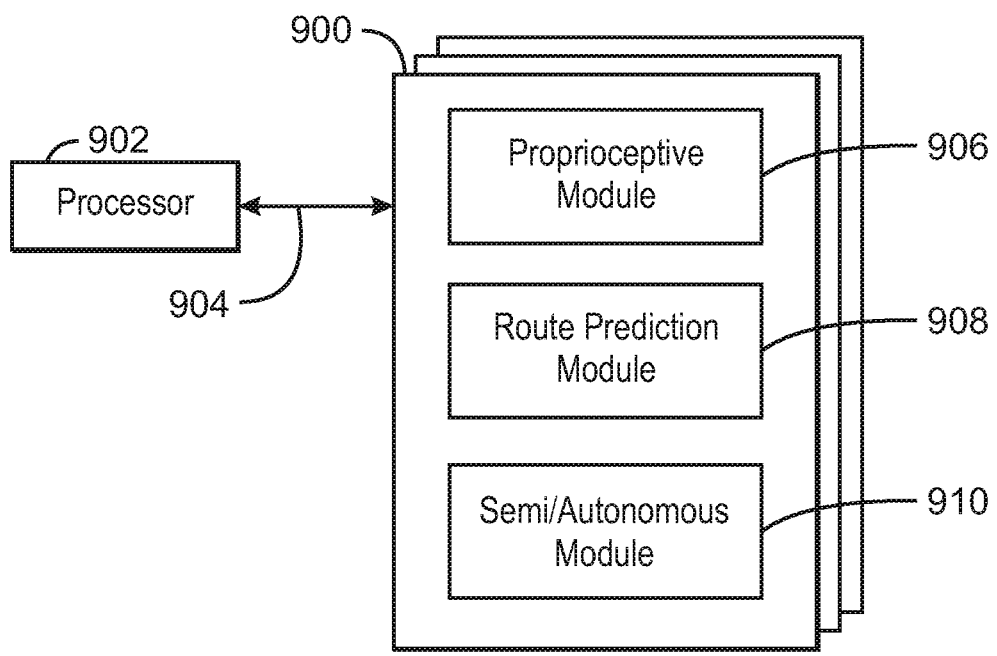
FIG. 9 is a block diagram showing a medium that contains logic for semiautonomous and autonomous vehicles.

FIG. 9 is a block diagram showing a medium 900 that contains logic for semiautonomous and autonomous vehicles. The medium 900 may be a computer-readable medium, including a non-transitory medium that stores code that can be accessed by a processor 902 over a computer bus 904. For example, the computer-readable medium 900 can be volatile or non-volatile data storage device. The medium 900 can also be a logic unit, such as an Application Specific Integrated Circuit (ASIC), a Field Programmable Gate Array (FPGA), or an arrangement of logic gates implemented in one or more integrated circuits, for example.

The various software components discussed herein may be stored on the tangible, non-transitory computer-readable medium 900, as indicated in FIG. 9. The medium 900 may include modules 906-910 configured to perform the techniques described herein. For example, a proprioceptive module 906 may be configured to provide haptic, tactile, or kinesthetic feedback to a rider. A route prediction module 908 may be configured to predict a route to be taken by the rider. In embodiments, the route prediction module may also store a new route. A semi/autonomous module 910 may be configured to implement a semiautonomous functionality or an autonomous functionality based on the availability and desires of a rider.

The block diagram of FIG. 9 is not intended to indicate that the tangible, non-transitory computer-readable medium 900 is to include all of the components shown in FIG. 9. Further, the tangible, non-transitory computer-readable medium 900 may include any number of additional components not shown in FIG. 9, depending on the details of the specific implementation.

Example 1 is a system. The system includes a vehicle requiring a balance input to maintain an upright position; a plurality of sensors to determine threats within an environment; a controller to generate a plan in response to the threats; and a proprioceptive system to provide feedback to a rider of the vehicle according to the plan.

Example 2 includes the system of example 1, including or excluding optional features. In this example, the proprioceptive system is in physical contact with the rider.

Example 3 includes the system of any one of examples 1 to 2, including or excluding optional features. In this example, the feedback is haptic, tactile, or kinesthetic feedback applied to the rider based on the plan.

Example 4 includes the system of any one of examples 1 to 3, including or excluding optional features. In this example, an intensity of the provided feedback is increased in response to the rider not reacting to the plan.

Example 5 includes the system of any one of examples 1 to 4, including or excluding optional features. In this example, at least one processor is to predict a route for the vehicle based on prior routes taken by the vehicle.

Example 6 includes the system of any one of examples 1 to 5, including or excluding optional features. In this example, the system includes a plurality of wearable devices that comprise proprioceptive actuators.

Example 7 includes the system of any one of examples 1 to 6, including or excluding optional features. In this example, the plan comprises one or more actions for the rider of the vehicle to evade the threat.

Example 8 includes the system of any one of examples 1 to 7, including or excluding optional features. In this example, the feedback is halted when a predetermined time period expires.

Example 9 includes the system of any one of examples 1 to 8, including or excluding optional features. In this example, the feedback is halted when the threat is removed.

Example 10 includes the system of any one of examples 1 to 9, including or excluding optional features. In this example, the vehicle comprises less than four wheels.

Example 11 is a method. The method includes determining a threat to a vehicle within an environment, wherein the vehicle incorporates a balance input for movement; generating a plan in response to the threat; and providing proprioceptive feedback to a rider of the vehicle according to the plan.

Example 12 includes the method of example 11, including or excluding optional features. In this example, the vehicle is a bicycle, motorcycle, moped, scooter, or tricycle.

Example 13 includes the method of any one of examples 11 to 12, including or excluding optional features. In this example, the proprioceptive feedback is provided through a wearable proprioceptive actuator.

Example 14 includes the method of any one of examples 11 to 13, including or excluding optional features. In this example, the feedback is haptic, tactile, or kinesthetic feedback applied to the rider based on the plan.

Example 15 includes the method of any one of examples 11 to 14, including or excluding optional features. In this example, an intensity of the provided feedback is increased in response to the rider not reacting to the plan.

Example 16 includes the method of any one of examples 11 to 15, including or excluding optional features. In this example, at least one processor is to predict a route for the vehicle based on prior routes taken by the vehicle.

Example 17 includes the method of any one of examples 11 to 16, including or excluding optional features. In this example, the method includes a plurality of wearable devices in contact with the rider that comprise a plurality or proprioceptive actuators.

Example 18 includes the method of any one of examples 11 to 17, including or excluding optional features. In this example, the plan comprises one or more actions for the rider of the vehicle to evade the threat.

Example 19 includes the method of any one of examples 11 to 18, including or excluding optional features. In this example, the feedback is halted when a predetermined time period expires.

Example 20 includes the method of any one of examples 11 to 19, including or excluding optional features. In this example, the feedback is halted when the threat is removed.

Example 21 is an apparatus. The apparatus includes at least one wheel coupled with a frame and a steering actuator; a motorized drive unit to drive the at least one wheel; a stabilization system to maintain an upright position of the at least one wheel coupled with the frame during movement of the at least one wheel and frame; and a processing unit and communication system to receive instructions to traverse a route via control of the motorized drive unit and stabilization system.

Example 22 includes the apparatus of example 21, including or excluding optional features. In this example, the stabilization system is an active gyroscopic stabilization system.

Example 23 includes the apparatus of any one of examples 21 to 22, including or excluding optional features. In this example, the apparatus includes an imaging system that is to capture a surrounding environment.

Example 24 includes the apparatus of any one of examples 21 to 23, including or excluding optional features. In this example, the apparatus includes an imaging system coupled with the processing unit and communication system that is to capture images from a surrounding environment, wherein the processing unit and communication system is to avoid obstacles in the surrounding environment based on the captured images.

Example 25 includes the apparatus of any one of examples 21 to 24, including or excluding optional features. In this example, the steering actuator is an electro-mechanical steering actuator.

Example 26 includes the apparatus of any one of examples 21 to 25, including or excluding optional features. In this example, the apparatus includes a battery system to provide power to the motorized drive unit, stabilization system, and processing unit and communication system.

Example 27 includes the apparatus of any one of examples 21 to 26, including or excluding optional features. In this example, the apparatus includes a pedal system to drive the at least one wheel.

Example 28 includes the apparatus of any one of examples 21 to 27, including or excluding optional features. In this example, the processing unit and communication system comprises an autonomous controller to enable autonomous movement.

Example 29 includes the apparatus of any one of examples 21 to 28, including or excluding optional features. In this example, the apparatus includes an electro-mechanical kick stand to maintain an upright position of the at least one wheel and frame when no movement occurs.

Example 30 includes the apparatus of any one of examples 21 to 29, including or excluding optional features. In this example, at least a portion of the frame comprises a platform.

Example 31 is at least one non-transitory machine readable medium having instructions stored therein that. The computer-readable medium includes instructions that direct the processor to determine a threat to a vehicle within an environment, wherein the vehicle incorporates a balance input for movement; generate a plan in response to the threat; and provide proprioceptive feedback to a rider of the vehicle according to the plan.

Example 32 includes the computer-readable medium of example 31, including or excluding optional features. In this example, the vehicle is a bicycle, motorcycle, moped, scooter, or tricycle.

Example 33 includes the computer-readable medium of any one of examples 31 to 32, including or excluding optional features. In this example, the proprioceptive feedback is provided through a wearable proprioceptive actuator.

Example 34 includes the computer-readable medium of any one of examples 31 to 33, including or excluding optional features. In this example, the feedback is haptic, tactile, or kinesthetic feedback applied to the rider based on the plan.

Example 35 includes the computer-readable medium of any one of examples 31 to 34, including or excluding optional features. In this example, an intensity of the provided feedback is increased in response to the rider not reacting to the plan.

Example 36 includes the computer-readable medium of any one of examples 31 to 35, including or excluding optional features. In this example, at least one processor is to predict a route for the vehicle based on prior routes taken by the vehicle.

Example 37 includes the computer-readable medium of any one of examples 31 to 36, including or excluding optional features. In this example, the computer-readable medium includes a plurality of wearable devices in contact with the rider that comprise a plurality or proprioceptive actuators.

Example 38 includes the computer-readable medium of any one of examples 31 to 37, including or excluding optional features. In this example, the plan comprises one or more actions for the rider of the vehicle to evade the threat.

Example 39 includes the computer-readable medium of any one of examples 31 to 38, including or excluding optional features. In this example, the feedback is halted when a predetermined time period expires.

Example 40 includes the computer-readable medium of any one of examples 31 to 39, including or excluding optional features. In this example, the feedback is halted when the threat is removed.

Example 41 is an apparatus. The apparatus includes instructions that direct the processor to at least one wheel coupled with a frame and a steering actuator; a motorized drive unit to drive the at least one wheel; a stabilization system to maintain an upright position of the at least one wheel coupled with the frame during movement of the at least one wheel and frame; and a means to receive instructions to traverse a route via control of the motorized drive unit and stabilization system.

Example 42 includes the apparatus of example 41, including or excluding optional features. In this example, the stabilization system is an active gyroscopic stabilization system.

Example 43 includes the apparatus of any one of examples 41 to 42, including or excluding optional features. In this example, the apparatus includes an imaging system that is to capture a surrounding environment.

Example 44 includes the apparatus of any one of examples 41 to 43, including or excluding optional features. In this example, the apparatus includes an imaging system coupled with the means to receive instructions to traverse the route that is to capture images from a surrounding environment, wherein the means to receive instructions to traverse the route is to avoid obstacles in the surrounding environment based on the captured images.

Example 45 includes the apparatus of any one of examples 41 to 44, including or excluding optional features. In this example, the steering actuator is an electro-mechanical steering actuator.

Example 46 includes the apparatus of any one of examples 41 to 45, including or excluding optional features. In this example, the apparatus includes a battery system to provide power to the motorized drive unit, stabilization system, and the means to receive instructions to traverse the route.

Example 47 includes the apparatus of any one of examples 41 to 46, including or excluding optional features. In this example, the apparatus includes a pedal system to drive the at least one wheel.

Example 48 includes the apparatus of any one of examples 41 to 47, including or excluding optional features. In this example, the means to receive instructions to traverse the route comprises an autonomous controller to enable autonomous movement.

Example 49 includes the apparatus of any one of examples 41 to 48, including or excluding optional features. In this example, the apparatus includes an electro-mechanical kick stand to maintain an upright position of the at least one wheel and frame when no movement occurs.

Example 50 includes the apparatus of any one of examples 41 to 49, including or excluding optional features. In this example, at least a portion of the frame comprises a platform.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Although an example embodiment of the disclosed subject matter is described with reference to the drawings, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A computing device for a vehicle, comprising:
   a system interconnect configured to receive sensor data provided by a sensor associated with the vehicle, the vehicle being configured to utilize a balance input to autonomously maintain a balanced position; and
   a controller coupled to the system interconnect and configured to utilize the sensor data provided by the sensor to determine threats a threat within an environment of the vehicle, the threat being associated with an obstacle in the environment of the vehicle and external to the vehicle,
   wherein the controller is further configured to generate a plan in response to the threat, the plan including a direction of travel for the vehicle to avoid or mitigate the threat based upon a location of the threat with respect to the vehicle, and to cause feedback to be provided to a rider of the vehicle indicating the direction of travel of the vehicle in accordance with the plan,
   wherein the feedback is haptic, tactile, or kinesthetic feedback applied to the rider based on the plan, and
   wherein the controller is configured to cause an intensity of the provided feedback to increase in response to the vehicle moving in a direction other than the direction of travel in accordance with the plan.

2. The computing device of claim 1, wherein the feedback is generated via a proprioceptive system that is in physical contact with the rider.

3. The computing device of claim 1, further comprising:
   at least one processor configured to predict a route for the vehicle based on prior routes taken by the vehicle.

4. The computing device of claim 1, wherein the feedback is generated via a plurality of wearable devices that comprise proprioceptive actuators.

5. The computing device of claim 1, wherein the feedback is halted when a predetermined time period expires.

6. The computing device of claim 1, wherein the feedback is halted when the threat is removed.

7. The computing device of claim 1, wherein the vehicle comprises less than four wheels.

8. The computing device of claim 1, wherein the controller is configured to monitor behavior of the rider during operation of the vehicle, and to cause the generated feedback to be adjusted based upon the monitored behavior of the rider.

9. The computing device of claim 1, wherein the computing device is separate from the vehicle to enable the generation of the feedback in a retrofitted vehicle.

10. The computing device of claim 1, wherein the controller is configured to cause the intensity of the provided feedback to increase by increasing an amplitude of the generated feedback.

11. A method for autonomous techniques, comprising:
    determining a threat to a vehicle within an environment of the vehicle, the threat being associated with an obstacle in the environment of the vehicle and external to the vehicle,
    wherein the vehicle incorporates a balance input for autonomously maintaining a balanced position during operation;
    generating a plan in response to the threat, the plan including a direction of travel for the vehicle to avoid or mitigate the threat based upon a location of the threat with respect to the vehicle; and
    providing feedback to the rider of the vehicle indicating the direction of travel of the vehicle in accordance with the plan,
    wherein the feedback is haptic, tactile, or kinesthetic feedback applied to the rider based on the plan, and
    wherein an intensity of the provided feedback is increased in response to the vehicle moving in a direction other than the direction of travel in accordance with the plan.

12. The method of claim 11, wherein the vehicle is a bicycle, motorcycle, moped, scooter, or tricycle.

13. The method of claim 11, wherein the act of generating the feedback comprises generating the feedback via a wearable proprioceptive actuator.

14. An apparatus for autonomous techniques, comprising:
    a plurality of sensors configured to provide sensor data associated with an environment of a vehicle; and
    a computing system configured to:
      receive instructions to traverse a route via control of the vehicle, the vehicle being configured to utilize a balance input to autonomously maintain a balanced position,
      determine, using the sensor data, a threat within the environment that is associated with an obstacle in the environment of the vehicle and external to the vehicle;
      generate a plan including a direction of travel for the vehicle to avoid or mitigate the threat based upon a location of the threat with respect to the vehicle; and
      cause feedback to be generated having an intensity that is increased in response to the vehicle moving in a direction other than the direction of travel in accordance with the plan.

15. The apparatus of claim 14, further comprising:
    an active gyroscopic stabilization system configured to maintain an upright position of at least one wheel of the vehicle during operation of the vehicle.

16. The apparatus of claim 14, wherein the plurality of sensors comprise an imaging system configured to capture the environment.

17. The apparatus of claim 14, wherein the plurality of sensors comprise an imaging system coupled with the computing system, the imaging system being configured to capture images from the environment, and
   wherein the computing system is configured to avoid the threat in the environment based on the captured images.

18. The apparatus of claim 14, further comprising:
   at least one wheel coupled with a frame and a steering actuator,
   wherein the steering actuator is an electro-mechanical steering actuator.

19. The apparatus of claim 14, further comprising:
   a motorized drive unit configured to drive at least one wheel of the vehicle;
   a stabilization system to maintain an upright position of the at least one wheel during operation of the vehicle; and
   a battery system configured to provide power to the motorized drive unit, the stabilization system, and the computing system.

20. The apparatus of claim 14, further comprising:
   a pedal system configured to drive at least one wheel of the vehicle.

21. The apparatus of claim 14, wherein the computing system comprises an autonomous controller configured to enable autonomous movement of the vehicle.

22. The apparatus of claim 14, further comprising:
   an electro-mechanical kick stand configured to maintain an upright position of at least one wheel of the vehicle and a frame of the vehicle when the vehicle is not moving.

23. The apparatus of claim 14, wherein at least a portion of a frame of the vehicle comprises a platform.

* * * * *